United States Patent
Salman et al.

(10) Patent No.: US 11,802,784 B1
(45) Date of Patent: Oct. 31, 2023

(54) SINGLE HEATER MEMS-CMOS BASED FLOW SENSOR

(71) Applicant: KING FAISAL UNIVERSITY, Al-Ahsa (SA)

(72) Inventors: Saed Amin Salman, Al-Ahsa (SA); Mohd Al Saleh Al Othoum, Al-Ahsa (SA); Alaaedeen R. Abuzir, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/142,704

(22) Filed: May 3, 2023

(51) Int. Cl.
  *G01F 1/704* (2006.01)
  *G01F 1/692* (2006.01)
  *G01F 1/688* (2006.01)
  *G01F 1/684* (2006.01)
  *G01F 1/69* (2006.01)

(52) U.S. Cl.
  CPC .......... *G01F 1/7044* (2013.01); *G01F 1/6845* (2013.01); *G01F 1/6888* (2013.01); *G01F 1/69* (2013.01); *G01F 1/692* (2013.01)

(58) Field of Classification Search
  CPC .... G01F 1/7044; G01F 1/6845; G01F 1/6888; G01F 1/692; G01F 1/69
  See application file for complete search history.

(56) References Cited

U.S. PATENT DOCUMENTS

| | | | |
|---|---|---|---|
| 4,319,483 A | 3/1982 | Durham, Jr. et al. | |
| 6,125,695 A | 10/2000 | Alvesteffer et al. | |
| 6,508,117 B1 | 1/2003 | Dubois et al. | |
| 7,054,767 B2 | 5/2006 | Eldridge | |
| 8,356,514 B2 | 1/2013 | Wang et al. | |
| 10,739,175 B1 | 8/2020 | Salman et al. | |
| 11,525,721 B1 | 12/2022 | Salman et al. | |
| 2009/0158838 A1* | 6/2009 | Speldrich | G01F 15/006 73/272 R |
| 2009/0164163 A1 | 6/2009 | Wang et al. | |
| 2016/0033212 A1* | 2/2016 | Wang | F28F 13/187 165/104.21 |
| 2019/0285453 A1* | 9/2019 | Higashi | G01F 15/043 |
| 2021/0396562 A1* | 12/2021 | Beck | G01F 1/688 |
| 2022/0120701 A1 | 4/2022 | Udrea et al. | |

FOREIGN PATENT DOCUMENTS

| | | |
|---|---|---|
| CN | 102353409 B | 2/2012 |
| DE | 10358281 B4 | 7/2004 |
| EP | 3104137 A1 | 12/2016 |
| JP | 2008180739 A | 8/2008 |

* cited by examiner

*Primary Examiner* — Paul M. West
(74) *Attorney, Agent, or Firm* — Nath, Goldberg & Meyer; Richard C. Litman

(57) ABSTRACT

A Wheatstone bridge flowmeter is formed on a base substrate with a fluid passageway formed over or through a top surface of the base substrate. Resistors forming the Wheatstone bridge and a heater are arranged in a linear physical arrangement along the passageway, such that two resistors on one side of the Wheatstone bridge are sequentially upstream of the heater and two resistors on the other side of the Wheatstone bridge are sequentially downstream of the heater, establishing a sequential arrangement along the fluid passageway of two of the resistors, the heater and the other two resistors. Heating of the fluid by the heater creates a differential in the temperatures of the resistors, thereby changing the output sensing voltages across the Wheatstone bridge.

18 Claims, 5 Drawing Sheets

SINGLE HEATER MEMS-CMOS BASED FLOW SENSOR

BACKGROUND

Technical Field

The present disclosure relates to a Wheatstone bridge solid state anemometer type flow sensor, using a flow channel etched in a semiconductor substrate.

Background Art

Wheatstone bridge flowmeters rely on changes resulting from flow across the Wheatstone bridge circuit. One technique is to use the Wheatstone bridge to sense temperature changes induced in a fluid as the fluid flows through a passage.

Sensors are used in a wide variety of applications. Some sensors include a heater resistor and/or one or more sensor resistors. Such sensors may include flow sensors, thermal conductivity sensors, chemical sensors, and/or other types of sensors. Under some circumstances, such sensors may become thermally unstable, which can affect their accuracy and/or reliability. By way of example, if a sensor includes a heater resistor that has a positive temperature coefficient of resistance, and is driven by a constant current source, the heater resistor may heat up, which may then cause the resistance of the heater resistor to further increase, which may cause the heater resistor to heat up further, and so on. This loop may cause damage to the heater resistor and/or the sensor more generally.

A typical sensor element for use in such meters is a Resistance Temperature Detector (RTD), the resistance of which is related to the temperature of the element itself. A typical bridge employs two RTD elements. One of the RTD elements is referred to as a temperature sensor element and is unheated. A flow sensor RTD element is heated and the effect of mass flow on the heated element provides a measure of the flow velocity of the fluid in a flow tube being monitored. The temperature of the fluid, such as a gas, flowing across the heated RTD is also a factor in the amount of heat dissipated from that RTD.

A number of common implementations of differential temperature sensors are configured with the temperature and flow sensors arranged as a Wheatstone bridge. The sensors are mounted in the fluid conduit and project into the flow path as an insertion flow sensor. The sensor elements are positioned to permit unobstructed flow fluid past both the flow sensor and the temperature sensor in such a way that one does not thermally influence the other. Consequentially, the temperature sensor must be a reference with respect to the fluid being sensed without influence from the heat of the flow sensor or the fluid heated by the heated sensor.

Calorimetric flow sensors usually consist of a heater surrounded by temperature sensitive elements arranged symmetrically downstream and upstream. A moving fluid will carry away heat in the direction of flow and accordingly change the temperature distribution around the heater. The temperature difference between upstream and downstream is measured by the temperature sensitive elements. The output signal is commonly fetched using a Wheatstone bridge circuit, in which a pair of downstream and upstream sensing elements comprises two of its four branches. The output signal, which is a measure of temperature difference, is proportional to the flow velocity initially until a high flow velocity is reached where the temperature difference saturates and then decreases at higher flow velocity. In general, calorimetric flow sensors can accurately measure flows with extremely low velocities. Such calorimetric flow sensors may saturate at high flow velocities and hence have a difficulty to measure flows above a certain level of flow velocity. Many traditional thermal mass flow meters using capillary approach utilize this principle.

SUMMARY

A Wheatstone bridge flowmeter is formed on a substrate with a fluid passageway formed over or through a top surface of the substrate. At least one heater is provided on the substrate in thermal proximity to the fluid passageway and a plurality of resistors, connected as a Wheatstone bridge, are arranged along the fluid passageway. The resistors and heater are arranged in a physical arrangement along the passageway in a linear arrangement, such that two resistors on one side of the Wheatstone bridge are sequentially upstream of the heater and two resistors on the other side of the Wheatstone bridge are sequentially downstream of the heater, establishing a sequential arrangement along the fluid passageway of two of the resistors, the heater and the other two resistors. The resistors are in thermal proximity to the passageway, and the resistors having predetermined temperature coefficients of resistance. An output circuit senses voltages across the Wheatstone bridge to provide an output corresponding to fluid flow through the fluid passageway. Fluid flowing through the fluid passageway establishes heat communication, in a flow direction, with sequential ones of two of the resistors upstream of the heater, thence the heater, thence two of the resistors downstream of the heater. Heating of the fluid by the heater creates a differential in the temperatures of the resistors, thereby changing the output sensing voltages across the Wheatstone bridge.

DETAILED DESCRIPTION

Figure 1:
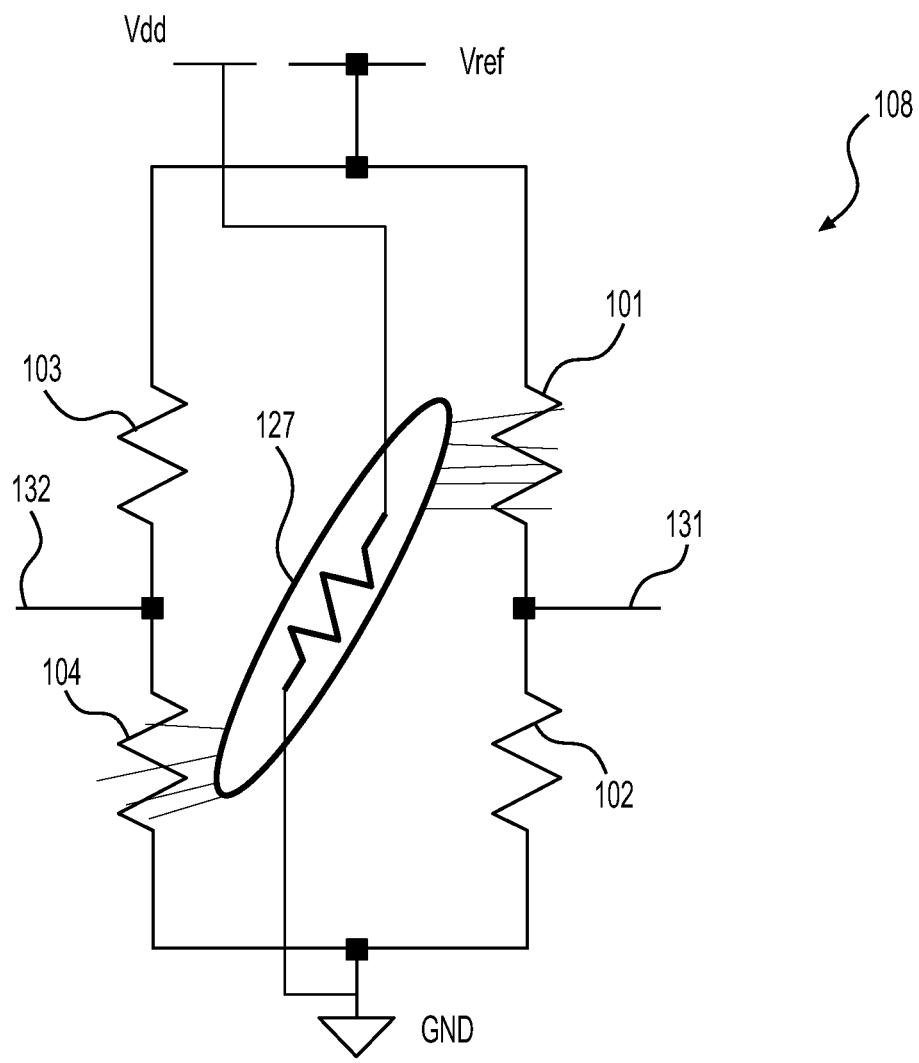
FIG. 1 is a schematic diagram showing a Wheatstone bridge sensor circuit using four resistors forming a Wheatstone bridge, in combination with a heater.

A Wheatstone bridge solid state anemometer type flow sensor is implemented using a flow channel etched in a semiconductor substrate and a top cap channel. A heater is placed in the flow channel, with pairs of resistances on opposite sides of the Wheatstone bridge arranged as one series pair of positive temperature coefficient (PTC) resistors, and one series pair of negative temperature coefficient (NTC) resistors, constituting the Wheatstone bridge. The heater is placed in a physical location in the middle of the bridge, which positions it between the PTC and NTC resistors. The NTC and PTC resistor combination results in a higher sensor sensitivity.

Features and advantages of the technique include a membrane type Wheatstone bridge in which resistances that enhance the sensitivity span of anemometer. The configuration reduces the needed power applied to heater, and provides a higher dynamic range, using standard CMOS and MEMS integrated semiconductors to produce the PTC and NTC resistances in the Wheatstone bridge. Specific features include:

1. The use of a membrane type Wheatstone bridge with certain temperature coefficient resistances that can be achieved by different techniques to significantly enhance the sensitivity range of an anemometer type flow sensor at the manufacturing level without the need of extra signal processing components.
2. Reduced power requirements applied to heat the flow sensor.
3. The higher dynamic range of the analog signal at the output of Wheatstone bridge, and consequential lowered noise level than what may occur using digital processing.
4. Cost effective fabrication that requires standard CMOS and MEMS integrated semiconductor manufacturing techniques to realize the PTC and NTC of the Wheatstone bridge resistances.

The disclosed technique implements an anemometer type flow sensor on flow channel an etched in semiconductor substrate and a top cap channel. The sensing elements comprise released and suspended structures across the flow channel, and they are electrically connected in Wheatstone bridge configuration and a heater is placed in such a way to maximize the sensitivity of the air flow.

The Wheatstone bridge is implemented in a solid state anemometer type flow sensor, using a flow channel an etched in semiconductor substrate and a top cap channel. A heater is placed in the flow channel, with pairs of resistors on opposite sides of the Wheatstone bridge arranged as one series pair of positive temperature coefficient (PTC) resistors, and one series pair of negative temperature coefficient (NTC) resistors, constituting the Wheatstone bridge. The heater is placed in middle of the bridge, which positions it between the PTC and NTC resistors. The NTC and PTC resistor combination results in a higher sensor sensitivity.

The use of a membrane type Wheatstone bridge with certain temperature coefficient resistances that can be achieved by different techniques to significantly enhance the sensitivity span of anemometer type flow sensor at the manufacturing level without the need of extra signal processing components. The technique reduces the needed power applied to heater significantly, allowing the construction of an operational flow sensor at the cost of doping the resistance according to the explained scheme. This provides a higher dynamic range of the archived analog signal at the output of Wheatstone bridge, which lowers the signal-to-noise level that might otherwise occur in digital processing. The technique is cost-effective in that it requires standard CMOS and MEMS integrated semiconductor to realize the PTC and NTC of the Wheatstone bridge resistances. A significant enhancement of dynamic range (sensitivity) is achievable by adjusting the type and the doping concentration of the implants.

FIG. 1 is a schematic diagram showing a Wheatstone bridge sensor circuit 100 using four resistors 101, 102, 103, 104 forming a Wheatstone bridge 108. Resistors 101 and 102 are positive temperature coefficient of resistance (PTC), whereas resistors 103 and 104 are negative temperature coefficient of resistance (NTC). Resistors 101-104 are arranged on Wheatstone bridge 108 such that PTC resistors 101, 102 are in a series connection on one side of Wheatstone bridge 108 and NTC resistors 103, 104 are in a corresponding series connection on the other side of Wheatstone bridge 108. Wheatstone bridge 108 is powered, as represented by $V_{ref}$ to GND.

Heater 127 is located in close proximity to resistors 101 and 104; in other words close to one PTC resistor 101 and one NTC resistor 104, but resistors 101 and 104 are on opposite sides of Wheatstone bridge 108. The other two resistors 102 and 103 are further from heater 127 and are also on opposite sides of Wheatstone bridge 108.

The arrangement is such that one PTC resistor, shown as PTC resistor 101, in close proximity to heater 127 is series connected so as to be closest to one Wheatstone bridge power source terminal, shown as $V_{ref}$, whereas one NTC resistor 104, also in close proximity to heater 127 is closest to the other Wheatstone bridge power source terminal, shown as GND. The identity of which terminal is $V_{ref}$ and which is GND is given for reference, and the circuit works in a similar manner if $V_{ref}$ and GND are transposed, or if $V_{ref}$ is positive or negative.

Conversely the other PTC resistor 102 in series with PTC resistor 101 near heater 127, and the other NTC resistor 103 in series with NTC resistor 104 near heater 127 are on opposite sides and are located further away from heater 127 than resistors 101 and 104. Wheatstone bridge 108 is sensed from voltage sense taps 131, 132.

In the example, heater 127 is powered by a separate power source $V_{dd}$, which allows for ease of control of the heater 127 independently of Wheatstone bridge 108.

Figure 2:
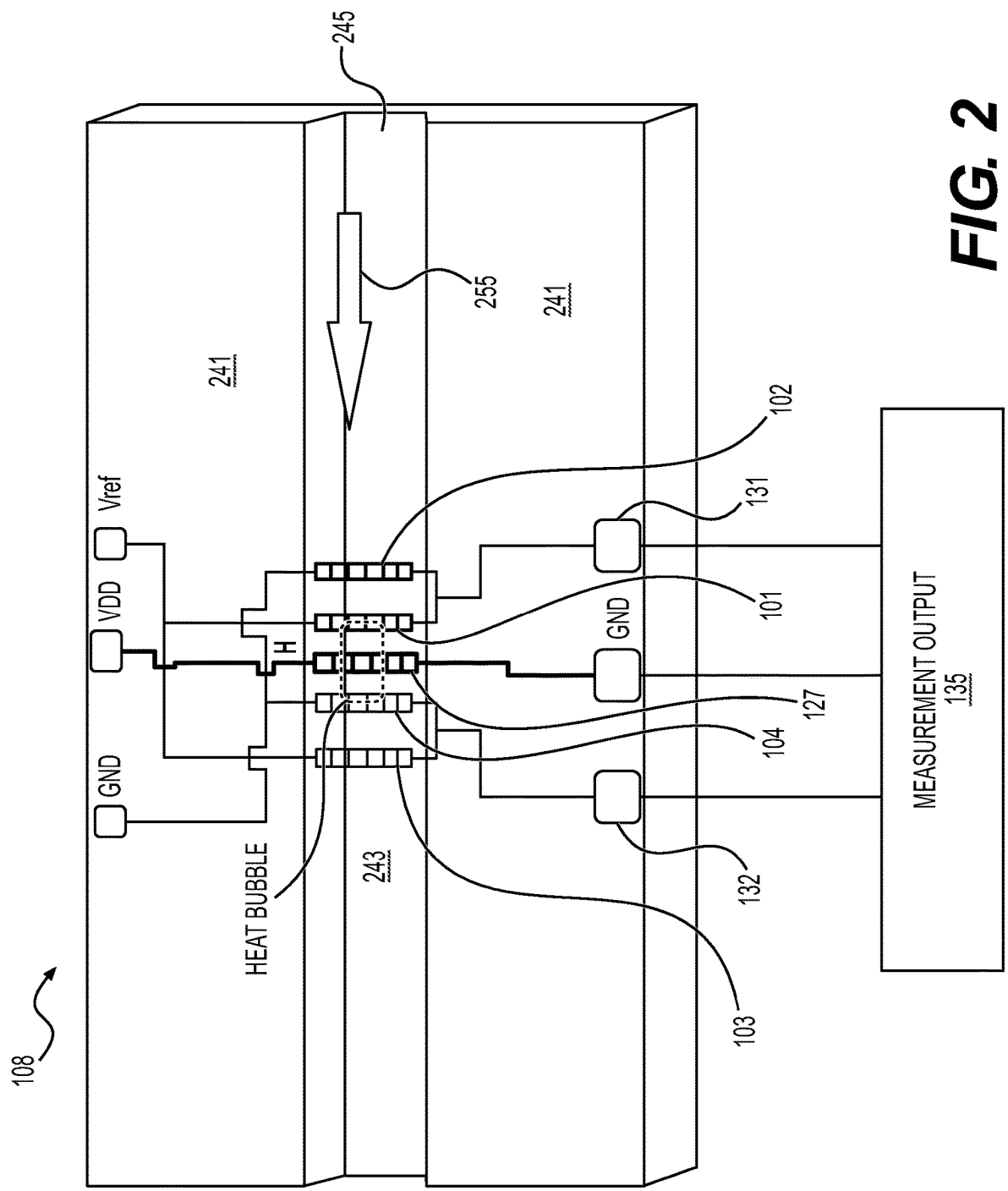
FIG. 2 is a schematic diagram showing the physical arrangement of the Wheatstone bridge and heater of FIG. 1.

FIG. 2 is a schematic diagram showing the physical arrangement of Wheatstone bridge 108 and heater 127 on base substrate 241 along a flow channel 243. The resistors are arranged with resistors 101 and 104 at a center location of flow channel 243, with each adjacent to heater 127. Resistors 102 and 103 are at end locations of flow channel 243.

This physical configuration meets the condition described in connection with FIG. 1, in which resistors 101 and 104 are in close proximity to heater 127, and resistors 102 and 103 are further from heater 127. The physical sequence of the components is PTC resistor 102, PTC resistor 101, heater 127, NTC resistor 104, NTC resistor 103. These components are mounted on base substrate 241, with flow channel 243 passing the resistors 101-104 and heater 127 in that sequence. In a non-limiting example, flow channel 243 may have a restriction orifice, such as flow inlet 245. The structure allows base substrate 241 substrate to be connected from all its sides, and the membrane may be formed by back etching process, which provides a more effective sensing structure.

Figure 3:
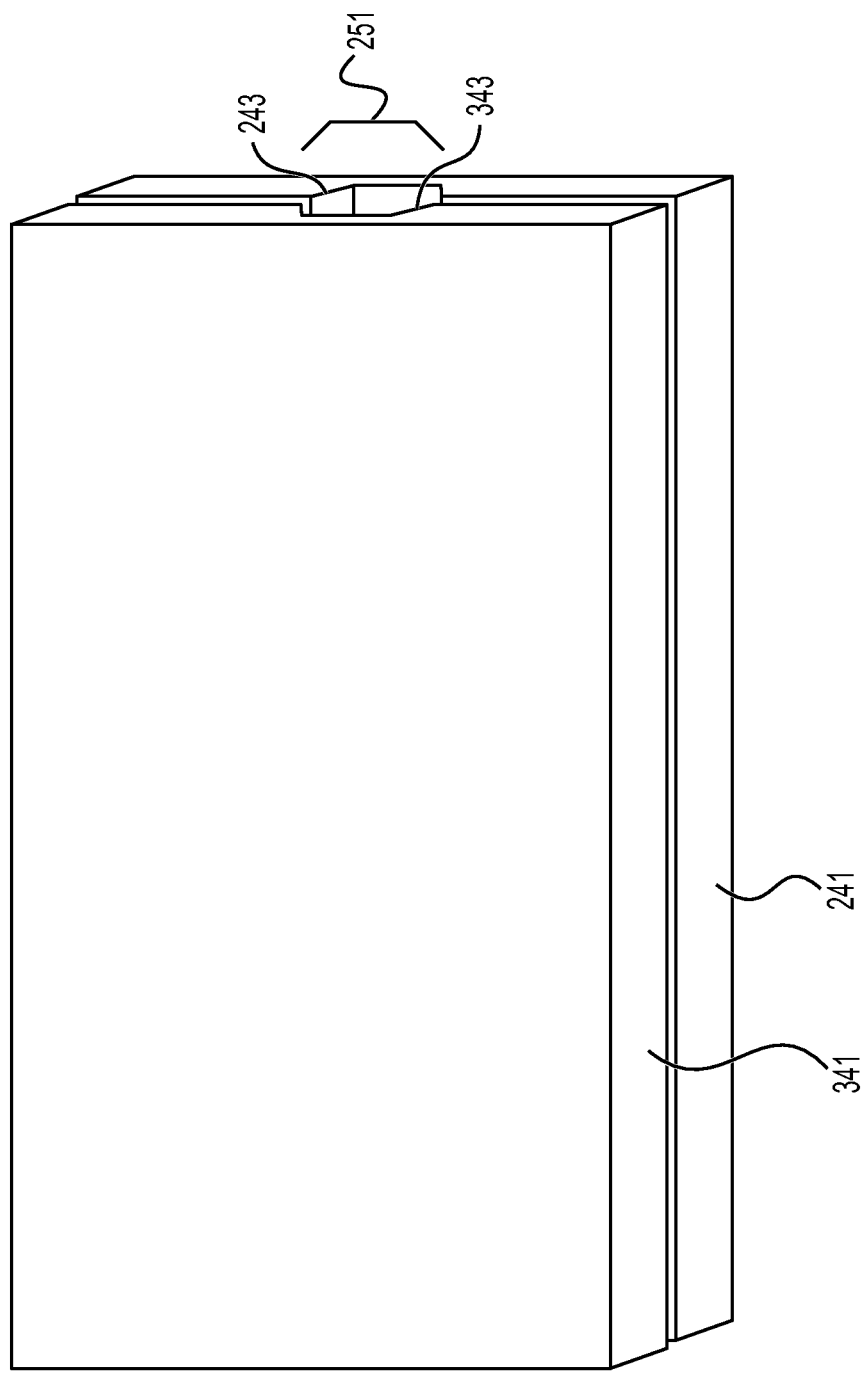
FIG. 3 is a schematic diagram showing the physical arrangement of the Wheatstone bridge and heater of FIG. 1, showing a top cap substrate and a top cap channel.

FIG. 3 is a schematic diagram showing the physical arrangement of the Wheatstone bridge and heater of FIG. 1, showing a top cap substrate and a top cap channel. Top cap 341 and top cap flow channel 343 are fitted above base substrate 241, such that top cap flow channel 343 aligns with flow channel 243 to establish fluid flow path 251 as a fluid passageway.

Figure 4:
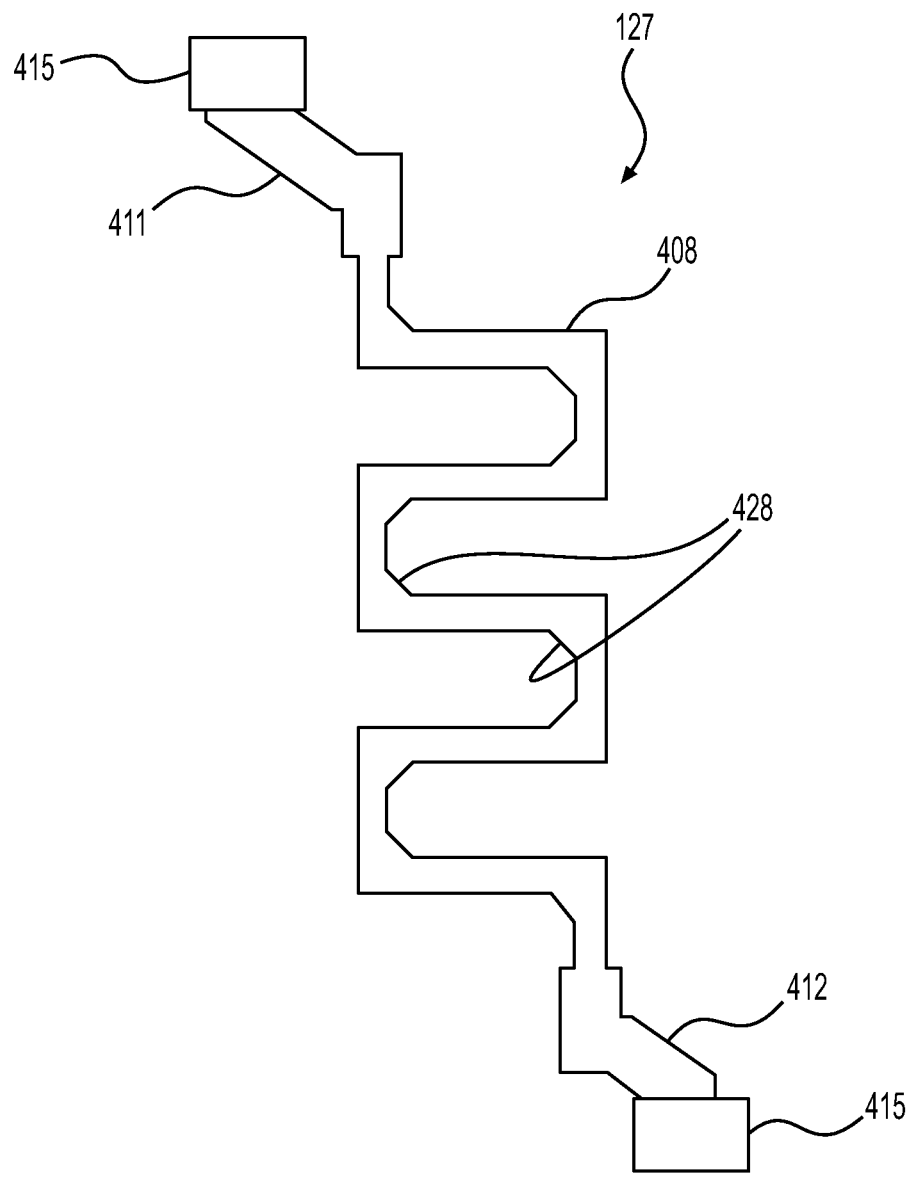
FIG. 4 is a schematic diagram showing a non-limiting example of a construction of heater using a zigzag configuration.

FIG. 4 is a schematic diagram showing a non-limiting example of a construction of heater 127, using a zigzag configuration. Heater 127 incorporates heater element 408, suspending arms 411, 412 and electrical contacts 415 are used to connect heater 127 to base substrate 241. The zigzag configuration provides efficient transfer of heat to the fluid and extend the length of heater 127 over a short width of channel 127. Inner corners 428 of the heater resistance are smoothed to ensure a better and smooth current flow at the inner edges of the heater. This enhances fluid flow and provides better drift stability when heater 127 operates at high temperatures.

Figure 5:
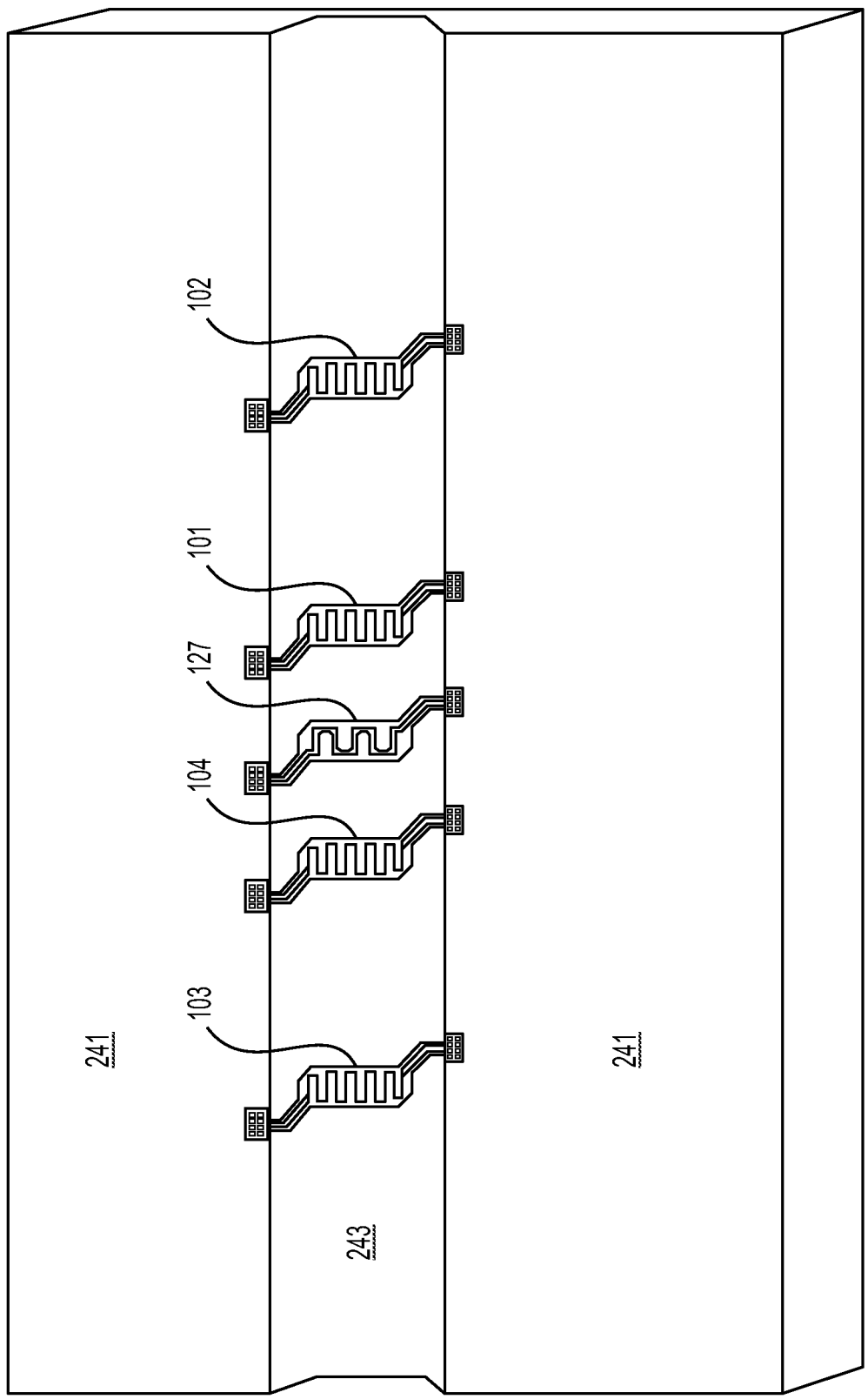
FIG. 5 is a schematic diagram showing a configuration and arrangement of resistors and heater.

FIG. 5 is a schematic diagram showing a configuration and arrangement of resistors 101, 102, 103, 104 and heater 127. The arrangement, from right to left, along flow channel 243 (and flow channel 343) is resistor 102-resistor 101-heater 127-resistor 104-resistor 103, and if the flow through channel 243 is reversed, the arrangement is effectively reversed (102-101-127-104-103). Resistors 101-104 are suspended across flow channel 243 with suspending arms 511 and have electrical contacts 515. Electrical contacts 515 are attached to base substrate 241, so that resistors 101-104 are suspended across flow channel 242 and attached to base substrate 241 in the manner of heater 127. As a result, resistors 101-104 and heater 127 are suspended in the fluid flow path 251 established by flow channel 243 and top cap flow channel 343.

Accordingly, all four Wheatstone bridge resistances 101-104 are suspended over flow channel 243, which ensures maximum matching of their resistance values. The fully suspended structures of resistors 101-104 and heater 127, with minimum substrate contact attained by narrow and long arms at the two sides of the flow channel provides an enhanced thermally isolation and they allow air to flow symmetrically through the upper and lower directions of the sensing elements. This results in a very fast response time of the flow sensor, as the thermal mass of the structures is very low and a minimal change in the "hot air bubble" will be detected. Hence, the maximum sensitivity to the moving "bubble" is attained.

If fluid flow, indicated by arrow 255 follows this sequence, the fluid would pass, in sequence PTC resistor 102, PTC resistor 101, heater 127, NTC resistor 104, NTC resistor 103. This results in fluid passing PTC resistors 102 and 101 before passing NTC resistors 104 and 103. It is noted that a corresponding, but opposite sequence occurs for flow in the opposite direction (103, 104, 101, 102). The fluid is heated by heater 127 in its transition from resistors 102 and 101 to resistors 104 and 103 in the direction shown in FIG. 2.

The result of the flow is that, in a static condition, the heating of PTC resistor 101 and NTC resistor 104, is (ideally) equal. Likewise the reduced heating of PTC resistor 102 and NTC resistor 103 is (ideally) equal. If flow is increased, the upstream resistors 102 and 101 are cooled, whereas the heating of the fluid increases the heating of resistors 104, 103. Since heater 127 is producing a finite amount of heat, increased flow will result in the heating of resistors 104 and 103 to be reduced; however, the difference between the temperatures of resistors 104 and 103 are caused to diminish. Likewise, increased flow will reduce the temperature of resistor 101, and will cause the difference between the temperatures of resistors 102 and 101 to diminish.

In this arrangement, the sensing of flow using Wheatstone bridge 108 can be made by sensing the difference between sense taps 131, 132. Measurement output circuit 135 provides an indication of flow output based on the sensed difference between sense taps 131, 132.

Accordingly, both the heater 127 and the set of sensing elements, resistors 101, 102, 103, 104 are specifically configured as suspended structures across end-to-end flow channel, where fluid (gas or liquid) symmetrically flows on top side and bottom side of the suspended structures of all sensor elements including the heater and the sensing elements. Heater 127 and sensing elements, resistors 101, 102, 103, 104 are nevertheless mounted on base substrate 241, which forms a continuous thin film membrane.

The suspended structures (heaters and WB resistances) are designed with narrow and long arms at their connections to the base chip (substrate) in order to minimize the heat loss by conduction to the substrate chip. This technique insures maximum thermal isolations, low thermal mass and minimum power consumption.

The disclosed technique implements an anemometer type flow sensor on flow channel an etched in semiconductor substrate. The sensing elements comprise released and suspended structures across the flow channel, and they are electrically connected in the Wheatstone bridge configuration and heater 127 is placed in such a way to maximize the sensitivity of the air flow. The sensing elements of Wheatstone bridge 108 have positive and negative temperature coefficients, in which the positive temperature coefficients (PTC) resistors 101, 102 are connected in series on one side of the Wheatstone bridge meanwhile the negative temperature coefficients (NTC) resistors 103, 104 are connected in series on the other side of the bridge, all resistors 101-104 are powered by reference voltage $V_{ref}$. Heater 127 is placed in middle of the resistors, between PTC resistors 101, 102 and NTC resistors 103, 104, such that, in a non-limiting example, PTC resistor 101 cools down as air flow through the flow channel 243, as shown in FIG. 2. Hence, its value decreases as the "hot air bubble" moves away from PTC resistor 101. As a result the voltage at sense tap 131 increases. On the other hand, the resistance value of NTC resistor 104 heats up as the "hot air bubble" gets closer to NTC resistor 104 and therefore its value decreases, causing the voltage at sense tap 132 decreases. Optimum selection of NTC and PTC resistance combination and the layout and electrical connection results in a higher sensor sensitivity. The resistances and heater structures can be implemented by a standard type MEMS process and the temperature coefficient of resistances of the resistors can be controlled by different polysilicon doping implants. Furthermore, the heater can be designed as low temperature coefficient material which alleviates the effect temperature sensitivity of the flow sensor.

In general, as flow increases, the differences between PTC resistors 101 and 102 are reduced because the fluid is flowing away from PTC resistors 101 and 102 toward heater 127, thereby reducing the temperature difference between PTC resistors 101 and 102. Also, as flow increases, the differences between NTC resistors 103 and 104 is decreased because the fluid is flowing from heater 127 and then past NTC resistors 103 and 104 at the flow rate. This results in a minimization of a voltage difference between sense taps 131, 132 at high flow rates.

At low flow rates, heater 127 preferentially heats PTC resistor 101 and NTC resistor 104, so a difference in the resistance occurs between PTC resistors 101 and 102, and a difference in the resistance occurs between NTC resistors 103 and 104. Because of the physical arrangement of PTC resistor 102, PTC resistor 101, heater 127, NTC resistor 104, NTC resistor 103, that difference decreases as flow rate increases, resulting in a larger difference between the voltage at sense taps 131, 132 at in no-flow conditions, with increases in flow rates resulting in increased differences between the voltage at sense taps 131, 132.

PTC resistor 101 value increases since it is PTC resistance thus the voltage sense tap 131 value decreases on the other hand, as the heater 127 turns on, NTC resistor 104 value decreases since it is NTC resistance thus the voltage sense tap 132 value decreases. In this specific design it is advantageous if the PTC and NTC coefficient values are inversely equal in value. This would result in an equal and same direction shift for both sense tap 131 and sense tap 132, which, in turn, results in a common mode shift of Wheatstone bridge 108, and further result in no differential signal occurring. Thus, the power up of such PTC and NTC Wheatstone bridge 108 will not affect the initial balance of Wheatstone bridge 108. This also affects the common mode voltage level, which will not have an effect on the expected differential signal as fluid flow takes place.

Furthermore, there exists a design consideration, in which the last case where of the temperature coefficient value for all four Wheatstone bridge resistors is the same (i.e., all four resistors in Wheatstone bridge 108 have PTC value or all four resistances in Wheatstone bridge 108 have NTC values). In this case, the common mode will not be affected when the heater 127 is turned on since the PTC resistor 101 and NTC resistor 103 resistance values are affected similarly.

In general, a low temperature coefficient heater 127 is placed in middle of the PTC and NTC resistors such as the PTC resistor 101 cools down as air flow through the channel inlet as indicated by the chip layout. Hence the PTC resistor 101 resistance value decreases as a region significantly heated by heater 127, or "hot air bubble", moves away and as a result the voltage sense tap 131 increases. On the other hand, the resistance value NTC resistor 104 which is NTC resistor (e.g., NTC resistors 103 and 104) heats up as the "hot air bubble" gets closer to it and therefore its value decreases; and as a result the voltage sense tap 132 decreases.

While the leading PTC resistors 101 and 102 and downstream NTC resistors 103 and 104 are shown, it is alternatively possible to provide upstream resistors 101 and 102 as NTC resistors, and provide downstream resistors 103 and 104 as NTC resistors, which would result in an inversion in the changes of voltages at sense tap 131 and sense tap 133.

It is also possible to arrange the Wheatstone bridge so that each side of the Wheatstone bridge has one NTC resistor and one PTC resistor on each side. If, for example, resistors 101 and 104 closest to heater 127 are both PTC resistors and resistors 102 and 103 are both NTC resistors, this would create a different relationship between the fluid flow rate and the differential voltage between sense tap 131 and sense tap 132.

In another example, the temperature coefficient of resistance of all four resistors 101, 102, 103, 104 are the same. Hence, a differential signal would result from the gas flow as the respective resistors 101, 102, 103, 104 heat up or cool down according to fluid flow, also resulting in a differential signal between sense taps 131 and 132. Using the same temperature coefficient of resistance results in smaller differential signals depending on the manufactured temperature coefficient of resistance values, whereas using both PTC and NTC resistors results in larger differential signals and an initial common mode shift of the output signal.

The single heater 127 concept can be extended to double-heater configurations, in which two heaters are be placed apart by a predetermined distance, and each heater 127 can preferentially affect only two resistors in the Wheatstone bridge in the same ways explained in the examples above.

While resistors 101-104 are described, it is possible to provide alternate impedances in the Wheatstone bridge circuit, in order to provide desired fluid flow measurement characteristics or to provide adjustments in the fluid flow measurement characteristics of the flowmeter.

CLOSING STATEMENT

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A Wheatstone bridge flowmeter comprising:
   a base substrate;
   a flow channel on a top surface of the base substrate;
   a top cap and a top cap flow channel, the top cap fitted to the corresponding to the base substrate and flow channel on the top surface, so that the flow channel on the top surface of the base substrate and so that the flow channel on the top surface of the base substrate and the top cap flow channel align to form a fluid passageway;
   at least one heater mounted on the base substrate over the flow channel on the top surface of the base substrate in thermal proximity to the fluid passageway; and
   a plurality of at least four resistors mounted on the base substrate in thermal proximity to the passageway and connected as a Wheatstone bridge circuit, the resistors having predetermined temperature coefficients of resistance, and arranged on the base substrate in the fluid passageway in a substantially linear configuration with each other and with the heater, in a sequential arrangement along the fluid passageway of two of the resistors, the heater and the other two resistors; and
   an output circuit sensing voltages across the Wheatstone bridge to provide an output corresponding to fluid flow through the fluid passageway,
   whereby fluid flowing through the fluid passageway establishes heat communication, in a flow direction, with sequential ones of two of the resistors upstream of the heater, thence the heater, and thence two of the resistors downstream of the heater, and heating of the fluid by the heater creates a differential in the temperatures of the resistors, thereby changing the output sensing voltages across the Wheatstone bridge.

2. The Wheatstone bridge flowmeter of claim 1, further comprising:
   the plurality of at least four resistors each mounted on the base substrate constructed with arms electrically connected to connections on the base substrate and suspending a center resistance portion at the flow channel on a top surface of the base substrate and within the fluid passageway;
   the heater comprising a zigzag heater structure with arms electrically connecting the ziz-zag heater structure to connections on the base substrate;
   the zigzag heater structure having smoothed angles at bends in the zigzag heater structure; and
   the arms connecting the plurality of at least four resistors and the arms connecting the heater to the base substrate being narrow and long arms located at two sides of the flow channel to thermally isolate the plurality of at least four resistors and the heater.

3. The Wheatstone bridge flowmeter of claim 1, further comprising an orifice of a predetermined size in a flow path of the fluid passageway.

4. The Wheatstone bridge flowmeter of claim 1, further comprising:

the resistors having an arrangement in the Wheatstone bridge such that resistors on a first side of the Wheatstone bridge so as to exhibit a first type of coefficient of resistance selected from a Positive Temperature Coefficient of resistance (PTC) and a Negative Temperature Coefficient of resistance (NTC), and the resistors on a second side of the Wheatstone bridge exhibit a second type of coefficient of resistance; selected from PTC and NTC; and the resistors on the first side of the Wheatstone bridge have positions upstream of the heater and the resistors on the second side of the Wheatstone bridge have positions downstream of the heater.

5. The Wheatstone bridge flowmeter of claim 4, further comprising:

the resistors having an arrangement in the fluid passageway such that one of the resistors at a first power supply pole of the Wheatstone bridge has a position closest to the heater upstream of the heater and one of the resistors at a second power supply pole of the Wheatstone bridge has a position closest to the heater downstream of the heater.

6. The Wheatstone bridge flowmeter of claim 1, further comprising:

the resistors having an arrangement in the Wheatstone bridge such that resistors on a first side of the Wheatstone bridge exhibit one each of coefficients of resistance selected from a Positive Temperature Coefficient of resistance (PTC) and a Negative Temperature Coefficient of resistance (NTC), and the resistors on a second side of the Wheatstone bridge exhibit one each of coefficients of resistance selected from PTC and NTC; and the resistors on the first side of the Wheatstone bridge have positions upstream of the heater and the resistors on the second side of the Wheatstone bridge have positions downstream of the heater.

7. The Wheatstone bridge flowmeter of claim 6, further comprising:

the resistors having an arrangement in the fluid passageway such that one of the resistors at a first power supply pole of the Wheatstone bridge has a position closest to the heater upstream of the heater and one of the resistors at a second power supply pole of the Wheatstone bridge has a position closest to the heater downstream of the heater.

8. The Wheatstone bridge flowmeter of claim 1, further comprising:

the resistors having an arrangement in the Wheatstone bridge such that resistors exhibit one type of coefficients of resistance selected from a Positive Temperature Coefficient of resistance (PTC) and a Negative Temperature Coefficient of resistance (NTC); and the resistors on the first side of the Wheatstone bridge have positions upstream of the heater and the resistors on the second side of the Wheatstone bridge have positions downstream of the heater.

9. The Wheatstone bridge flowmeter of claim 8, further comprising:

the resistors having an arrangement in the fluid passageway such that one of the resistors at a first power supply pole of the Wheatstone bridge has a position closest to the heater upstream of the heater and one of the resistors at a second power supply pole of the Wheatstone bridge has a position closest to the heater downstream of the heater.

10. A method of measuring fluid flow with a Wheatstone bridge, the method comprising:

providing a base substrate with a fluid passageway comprising a flow channel on a top surface of the base substrate over or through a top surface of the base substrate and a top cap flow channel formed on a top cap, with the top cap fitted to the corresponding to the base substrate and flow channel on the top surface so that the flow channel on the top surface of the base substrate and so that the flow channel on the top surface of the base substrate and the top cap flow channel align to form the fluid passageway;

providing, within the fluid passageway, a set of resistors arranged in a Wheatstone bridge circuit, and at least one heater, with the resistors having predetermined temperature coefficients of resistance;

providing the resistors attached to the base substrate, within the fluid passageway, in a substantially linear configuration with each other and with the heater, in a sequential arrangement along the fluid passageway of two of the resistors, the heater and the other two resistors; and sensing output voltages across the Wheatstone bridge to provide an output corresponding to fluid flow through the fluid passageway, whereby fluid flowing through the fluid passageway establishes heat communication, in a flow direction, with sequential ones of two of the resistors upstream of the heater, thence the heater, and thence two of the resistors downstream of the heater, and heating of the fluid by the heater creates a differential in the temperatures of the resistors, thereby changing the output sensing voltages across the Wheatstone bridge.

11. The method of claim 10, further comprising:

mounting the plurality of at least four resistors on the base substrate constructed with arms electrically connected to connections on the base substrate and suspending a center resistance portion at the flow channel on a top surface of the base substrate and within the fluid passageway;

providing the heater as comprising a zigzag heater structure with arms electrically connecting the zigzag heater structure to connections on the base substrate; and providing smoothed angles at bends in the zigzag heater structure, wherein the arms connecting the plurality of at least four resistors and the arms connecting the heater to the base substrate being narrow and long arms located at two sides of the flow channel to thermally isolate the plurality of at least four resistors and the heater.

12. The method of claim 10, further comprising controlling fluid flow through the fluid passageway using an orifice of a predetermined size in a flow path of the fluid passageway.

13. The method of claim 10, further comprising:

arranging the resistors in the Wheatstone bridge such that resistors on a first side of the Wheatstone bridge so as to exhibit a first type of coefficient of resistance selected from a Positive Temperature Coefficient of resistance (PTC) and a Negative Temperature Coefficient of resistance (NTC), and such that the resistors on a second side of the Wheatstone bridge exhibit a second type of coefficient of resistance; selected from PTC and NTC; and arranging the resistors along the flow channel so that the resistors on the first side of the Wheatstone bridge have positions upstream of the heater and the resistors on the second side of the Wheatstone bridge have positions downstream of the heater.

14. The method of claim 13, further comprising:

arranging the resistors in the fluid passageway such that one of the resistors at a first power supply pole of the Wheatstone bridge has a position closest to the heater upstream of the heater and one of the resistors at a second power supply pole of the Wheatstone bridge has a position closest to the heater downstream of the heater.

15. The method of claim 10, further comprising:

arranging the resistors in the Wheatstone bridge such that resistors on a first side of the Wheatstone bridge exhibit one of each of coefficients of resistance selected from a Positive Temperature Coefficient of resistance (PTC) and a Negative Temperature Coefficient of resistance (NTC), and the resistors on a second side of the Wheatstone bridge exhibit one each of coefficients of resistance selected from PTC and NTC; and arranging the resistors along the flow channel so that the resistors on the first side of the Wheatstone bridge have positions upstream of the heater and the resistors on the second side of the Wheatstone bridge have positions downstream of the heater.

16. The method of claim 15, further comprising:

arranging the resistors in the fluid passageway such that one of the resistors at a first power supply pole of the Wheatstone bridge has a position closest to the heater upstream of the heater and one of the resistors at a second power supply pole of the Wheatstone bridge has a position closest to the heater downstream of the heater.

17. The method of claim 10, further comprising:

arranging the resistors in the Wheatstone bridge such that resistors exhibit one type of coefficients of resistance selected from a Positive Temperature Coefficient of resistance (PTC) and a Negative Temperature Coefficient of resistance (NTC); and arranging the resistors along the flow channel so that the resistors on the first side of the Wheatstone bridge have positions upstream of the heater and the resistors on the second side of the Wheatstone bridge have positions downstream of the heater.

18. The method of claim 17, further comprising:

arranging the resistors in the fluid passageway such that one of the resistors at a first power supply pole of the Wheatstone bridge has a position closest to the heater upstream of the heater and one of the resistors at a second power supply pole of the Wheatstone bridge has a position closest to the heater downstream of the heater.

* * * * *